United States Patent
Voss et al.

(10) Patent No.: US 10,943,371 B1
(45) Date of Patent: Mar. 9, 2021

(54) CUSTOMIZING SOUNDTRACKS AND HAIRSTYLES IN MODIFIABLE VIDEOS OF MULTIMEDIA MESSAGING APPLICATION

(71) Applicant: Snap Inc., Santa Monica, CA (US)

(72) Inventors: Jeremy Voss, Los Angeles, CA (US); Victor Shaburov, Ocean Village (GI); Ivan Semenov, Astrakhan (RU); Diana Maximova, Sochi (UA); Alina Berezhko, Kyiv (UA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/836,276

(22) Filed: Mar. 31, 2020

(51) Int. Cl.
| | |
|---|---|
| G06T 11/00 | (2006.01) |
| G06T 7/11 | (2017.01) |
| G06T 7/40 | (2017.01) |
| H04W 4/14 | (2009.01) |

(52) U.S. Cl.
CPC ............... G06T 11/00 (2013.01); G06T 7/11 (2017.01); G06T 7/40 (2013.01); *G06T 2207/30201* (2013.01); *H04W 4/14* (2013.01)

(58) Field of Classification Search
CPC .............. G06T 11/00; G06T 7/11; G06T 7/40
See application file for complete search history.

(56) References Cited

U.S. PATENT DOCUMENTS

| | | | | | |
|---|---|---|---|---|---|
| 5,844,158 | A * | 12/1998 | Butler | ................... | H04M 3/487 84/650 |
| 8,498,453 | B1 * | 7/2013 | Benson | ................. | G06T 3/0012 382/118 |
| 2008/0267443 | A1 * | 10/2008 | Aarabi | ............... | G06K 9/00248 382/100 |
| 2009/0144639 | A1 * | 6/2009 | Nims | .................... | A61B 5/0022 715/757 |
| 2009/0193343 | A1 * | 7/2009 | Jones | ...................... | A63F 13/12 715/753 |
| 2009/0300513 | A1 * | 12/2009 | Nims | ...................... | A63F 13/58 715/747 |
| 2013/0304587 | A1 * | 11/2013 | Ralston | .............. | G06Q 30/0271 705/14.67 |
| 2014/0267342 | A1 * | 9/2014 | Liu | ......................... | G06T 11/60 345/581 |
| 2016/0328886 | A1 * | 11/2016 | Tong | ...................... | G06F 3/044 |
| 2017/0034453 | A1 * | 2/2017 | Usikov | .............. | G06K 9/00234 |
| 2018/0300927 | A1 * | 10/2018 | Hushchyn | ............. | H04L 65/602 |

* cited by examiner

*Primary Examiner* — Mishawn N. Hunter
(74) *Attorney, Agent, or Firm* — Georgiy L. Khayet

(57) ABSTRACT

A system for customizing soundtracks and hairstyles in modifiable videos of a multimedia messaging application (MMA) is provided. In one example embodiment, the system includes a processor and a memory storing processor-executable codes, wherein the processor is configured to receive, via the MMA, a modifiable video and an image of a user including an image of a face and an image of hair; determine that the image of hair is modifiable; modify the image of hair and generate a further image including the modified image of hair and the image of the face; generate, based on the further image and the modifiable video, a personalized video, wherein the personalized video includes a part of the further image of the user and a part of the modifiable video, and add a soundtrack to the personalized video based on predetermined criteria.

20 Claims, 12 Drawing Sheets

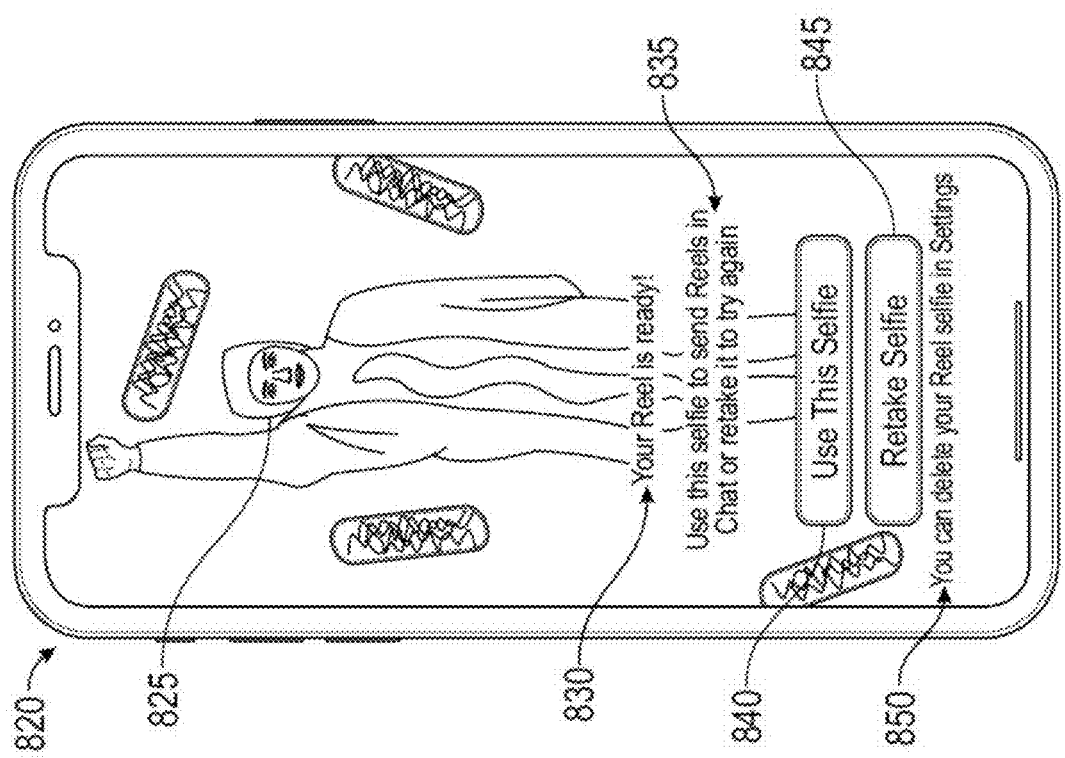
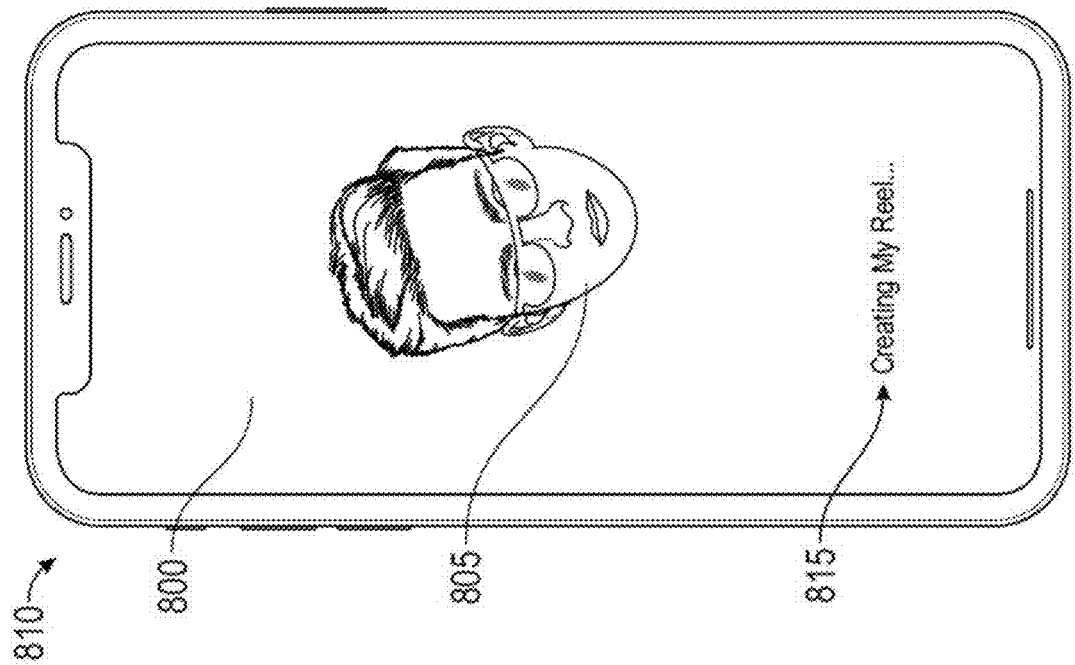
FIG. 8

CUSTOMIZING SOUNDTRACKS AND HAIRSTYLES IN MODIFIABLE VIDEOS OF MULTIMEDIA MESSAGING APPLICATION

TECHNICAL FIELD

This disclosure generally relates to multimedia messaging applications (MMAs) and, more particularly, to customizing soundtracks and hairstyles in modifiable videos of the MMAs.

BACKGROUND

Sharing media, such as stickers and emojis, has become a standard option in MMAs. Currently, some of the messengers provide users with an option for generating and sending images and short videos to other users via a communication chat. These short videos can be pre-generated and stored in a database and provided to the MMAs on demand.

BRIEF DESCRIPTION OF THE DRAWINGS

Embodiments are illustrated by way of example and not limitation in the figures of the accompanying drawings, in which like references indicate similar elements.

FIGS. 6-9 show screens of a user interface of an MMA, according to some example embodiments.

DETAILED DESCRIPTION

Figure 1:
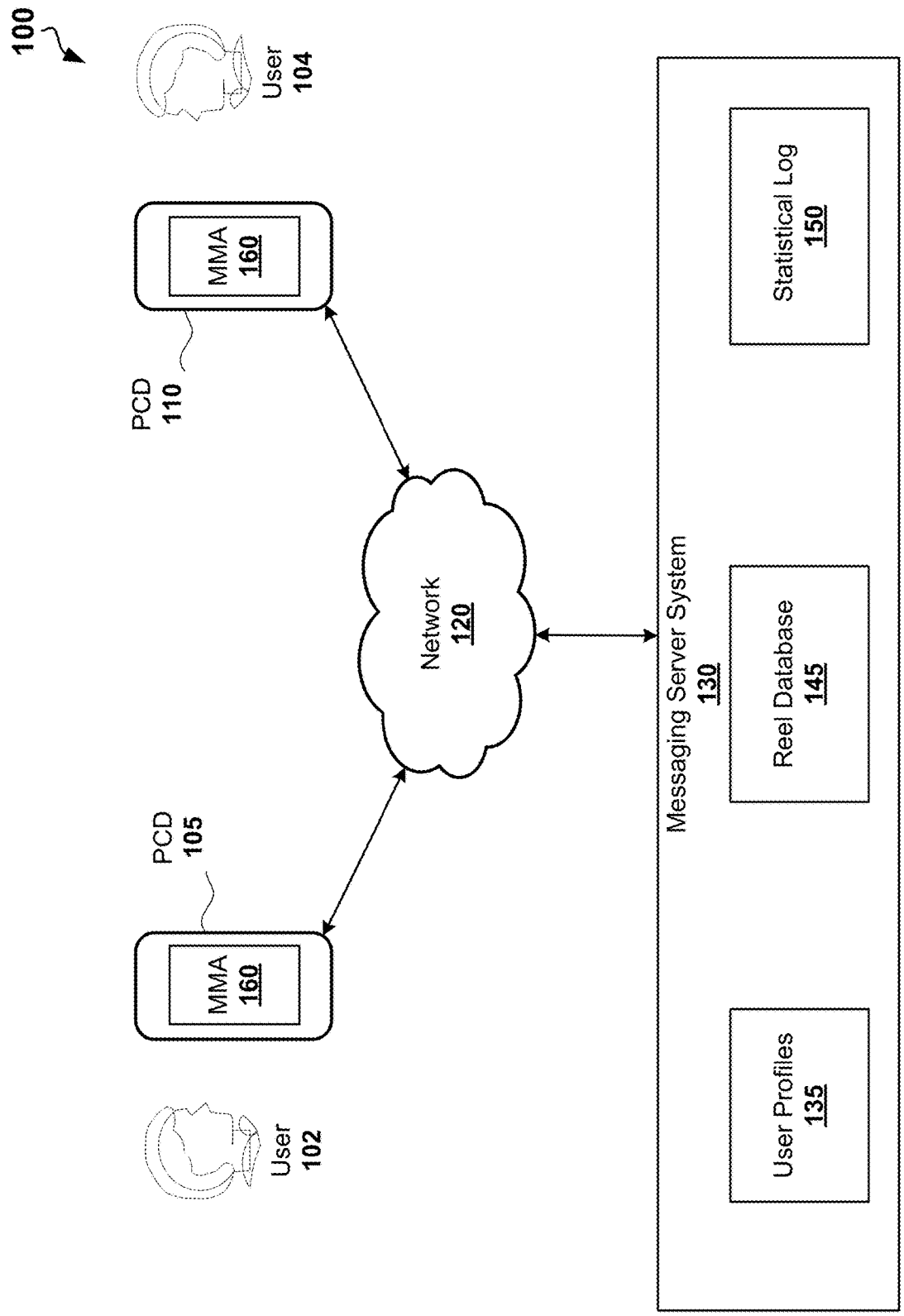
FIG. 1 is a block diagram showing an example environment wherein a system and a method for customizing soundtracks and hairstyles in modifiable videos of MMAs can be implemented.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The disclosure provided herein is directed to customizing soundtracks and hairstyles in reels used in an MMA. A reel, also referred to herein as a modifiable video, can be defined as a short movie or a video clip. The MMA is an application that can be executed on a personal computing device (PCD), such a smartphone, a tablet, a laptop, and so forth. The MMA can enable communication chats, in which users of the PCDs can exchange messages and reels.

The reels can be generated by the developer of the MMA and stored in a database. The database can reside in a computing cloud. While using the MMA, a user can view reels under various categories such as, for example, "Recent," "Featured," "Greetings," "Love," "Happy," "Upset," "Celebration," and so forth. The "Recent" category can be personalized for the user and include reels recently shared by the user with other users, most shared reals, popular reels, or any combinations of thereof. In one embodiment, the number of reels in the "Recent" category may be limited to a pre-determined number. If the number of the recently shared reels is less than the pre-determined number, the rest of positions of the "Recent" category can be filled with reels from the "Featured" category.

The MMA may also include a "Search" option. Upon selecting the "Search" option, the user may be able to type a search request. Upon submission of the search request and getting a result back, the user may review a list of reels found in the database and returned in response to the search request.

In some example embodiments, the user may select a reel from the categories or the search results and send the selected reel via the communication chat. The selected reel may include frames. Some of the frames may include an area designated for a facial image. The facial image can be also referred to as a selfie. The MMA may enable the user to generate the selfie using a camera application of the PCD or a photograph provided by the user. The selfie can be inserted into the area in the frame. The frame may include a set of facial parameters representing a facial expression. Upon being inserted into the frame, the selfie can adopt a facial expression. When the reel is played back, the selfie in the frames may perform facial movements according to the change in facial expressions across the frames in the reel.

The selected reel may include a pre-generated text message. Prior to sending the selected reel via the communication chat, the user can modify the text message and the style of the text message.

In some embodiments, prior to sending the reel via the communication chat, the user can add or change a soundtrack associated with the selected reel. The MMA can analyze recent messages of the user in the communication chat to determine context of the recent messages. The MMA may then provide a list of soundtracks to the user. The list of soundtracks can be selected based on the context of the recent messages. Alternatively, if no information concerning the user is available, the user can be allowed to select some popular soundtracks. The user can select a soundtrack from the list and add the soundtrack to the selected reel. In some embodiments, the user may record their voice using an audio recording system associated with the MMA. The MMA can then add the voice to the soundtrack of the selected reel or modify the soundtrack of the selected reel based on the user voice. In some embodiments, the user voice can be used to pronounce text message.

Additionally, some embodiments of the disclosure provided herein are directed to modifying a hairstyle of the user in the selfie inserted in the reels. In one example embodiment, the modification of the hairstyle is activated by the MMA based on predetermined criteria. For example, the criteria can be based on a volume of hair in the selfie of the user. The MMA can analyze the hairstyle, texture of the hair, and the selfie in order to suggest hair style modifications and texture to be applied to the selfie. The change in the texture of hair may include curling or straightening hair. The MMA may suggest shortening the hair if the hair is too long, lengthening the hair if the hair is too short, or raising the hair. The MMA may prompt the user to change the color of the hair in the selfie. The MMA may provide the user with an option to review one or more suggestions for hair modifications and allow the user to select and accept the modifications. The selfie with the modified hair can be inserted into the reels.

In some embodiments, the MMA may allow the user to generate more than one selfie with different hairstyles. When the user selects a reel, the MMA may analyze the reel and prompt the user to use a selfie from the list of the generated selfies with most suitable hairstyles for the selected reel. In some embodiments, the user may direct the MMA to automatically select a selfie with the most suitable hairstyle for the reel.

In some embodiments, analyzing the hair in the selfie may commence with segmenting the image of the selfie into a first part including the hair and a second part including the face of the user. The segmentation can be performed using machine learning techniques (for example, an artificial neural network (ANN)). A mask of the face can be generated based on the segmentation. The first part including the hair can be analyzed by another ANN to determine modifications to the hair and to automatically generate the selfie with modified hair. These modifications can include adding volume to the hair, lengthening hair, shortening hair, and so forth.

In some embodiments, the MMA may analyze the hair in the selfie and select a mask for the hair. The image of hair in the selfie can be generated by applying the mask to the selfie. The mask can be selected from a list of masks prepared for a reference head. The reference head can be generated based on a plurality of images of selfies of different users.

In some embodiments, if the hair is long enough, the hair in the selfie can be animated in the reels according to movements of the head and face. To generate the hair movements in the reels, the hair in the selfie can be analyzed to produce a three-dimensional (3D) hair model. The 3D hair model can be used to render an image of the hair in the reels based on movements of the head and the face.

FIG. 1 shows an example environment 100, wherein a system and a method for customizing soundtracks and hairstyles in modifiable videos in MMAs can be practiced. The environment 100 may include a PCD 105, a user 102, a PCD 110, a user 104, a network 120, and messaging server system (MSS) 130. The PCD 105 and PCD 110 can refer to a mobile device such as a mobile phone, smartphone, or tablet computer. In further embodiments, however, the PCD 110 can refer to a personal computer, laptop computer, netbook, set top box, television device, multimedia device, personal digital assistant, game console, entertainment system, infotainment system, vehicle computer, or any other computing device.

The PCD 105 and the PCD 110 can be communicatively connected to the MSS 130 via the network 120. The MSS 130 can be implemented as a cloud-based computing resource(s). The MSS 130 can include computing resource(s) (hardware and software) available at a remote location and accessible over a network (e.g., the Internet). The cloud-based computing resource(s) can be shared by multiple users and dynamically re-allocated based on demand. The cloud-based computing resources can include one or more server farms/clusters including a collection of computer servers which can be co-located with network switches or routers.

The network 120 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, and so forth.

In some embodiments of the disclosure, the PCD 105 and PCD 110 may include MMA 160 configured to enable a communication chat between the user 102 and the user 104. The user 102 and the user 104 may exchange text message and videos during the communication chat. The videos may include personalized videos. The personalized videos can be generated based on reels stored in the PCD 105 or the PCD 110. In some embodiments, the reels can be stored in the MSS 130 and downloaded to the PCD 105 or the PCD 110 via MMA 160 on demand.

The MSS 130 may include a reel database 145 for storing the reels. The reels can be generated based on animation videos or live action videos. The reels can be downloaded to the PCD 105 or the PCD 110. The MSS 130 may include a statistical log 150 for storing statistics of downloads of the reels to determine popularity metrics for the video templates. The popularity metrics can be divided into categories based on an age of user, gender of user, geographical region, and so forth. The statistical log 150 may also store statistics of sharing the reels by users of PCD 105 and PCD 110 via MMA 160.

The MSS 130 may be also configured to store user profiles 135. The user profiles 135 may include images of the face of the user 102, images of the face of the user 104, and images of faces of other persons. The images of the faces can be downloaded to the PCD 105 or the PCD 110 on demand and based on permissions. Additionally, the images of the face of the user 102 can be generated using the PCD 105 and stored in a local memory of the PCD 105. The images of the faces can be generated based on other images stored in the PCD 105. The images of the faces can be further used by the PCD 105 to generate personalized videos based on the reels. Similarly, the PCD 110 may be used to generate images of the face of the user 104. The images of the face of the user 104 can be used to generate, from the reels, personalized videos on the PCD 110.

In further embodiments, the images of the face of user 102 and images of the face of the user 104 can both be used to generate personalized videos on the PCD 105 or the PCD 110.

In some embodiments, a reel may include a preset default text message. The reel may further include preset text parameters for animation of the preset default text message in a personalized video generated based on the reel. The PCD 105 and PCD 110 can be configured to play back the personalized video featuring the preset text message animated based on the preset text parameters. During the playback of the personalized video, the MMA 160 may provide an option to change the preset default text message and parameters for displaying the text message in the personalized video. The PCD 105 may dynamically change the preset default text message in the personalized video while the personalized video is played back. The user 105 may then send the personalized video with the changed text message to the user 104 of the PCD 110 via MMA 160.

Figure 2:
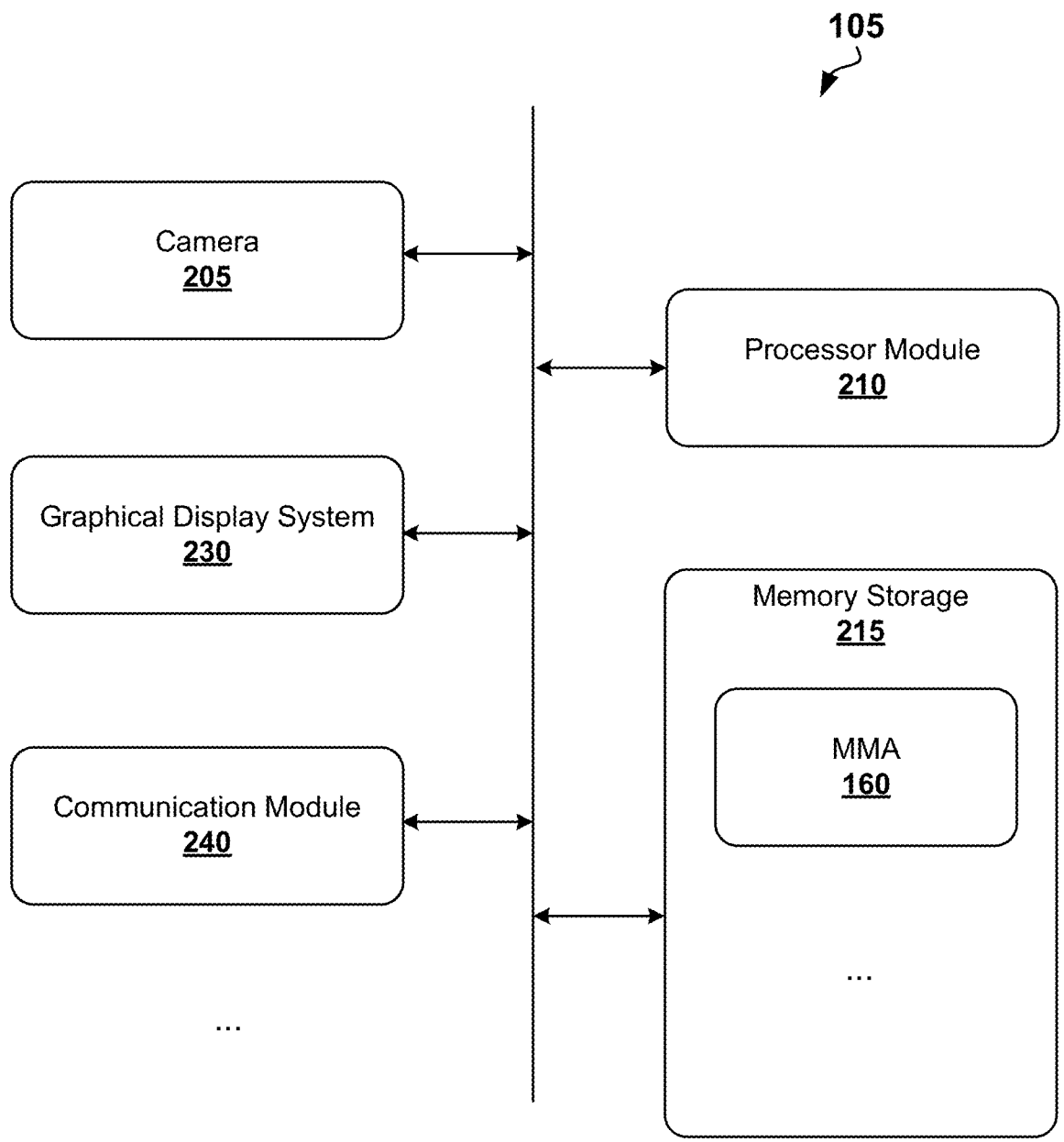
FIG. 2 is a block diagram showing an example embodiment of a computing device for implementing a method for customizing soundtracks and hairstyles in modifiable videos of MMAs.

FIG. 2 is a block diagram showing an example embodiment of a PCD 105 (or PCD 110) for implementing methods for customizing soundtracks and hairstyles in modifiable videos in MMAs. In the example shown in FIG. 2, the PCD 105 includes both hardware components and software components. Particularly, the PCD 105 includes a camera 205 or any other image-capturing device or scanner to acquire digital images. The PCD 105 can further include a processor module 210 and a memory storage 215 for storing software components and processor-readable (machine-readable) instructions or codes, which, when performed by the processor module 210, cause the PCD 105 to perform at least some steps of methods for customizing soundtracks and hairstyles in modifiable videos as described herein. The PCD 105 may include graphical display system 230 and a communication module 240. In other embodiments, the PCD 105 may include additional or different components. Moreover, the PCD 105 can include fewer components that perform functions similar or equivalent to those depicted in FIG. 2.

The PCD 105 can further include an MMA 160. The MMA 160 may be implemented as software components and processor-readable (machine-readable) instructions or codes stored in the memory storage 215, which when performed by the processor module 210, cause the PCD 105 to perform at least some steps of methods for providing communication chats, generation of personalized videos, and customizing soundtracks and hairstyles in modifiable videos in MMAs as described herein. A user interface of the MMA 160 can be provided via the graphical display system 230. The communication chats can be enabled by MMA 160 via the communication module 240 and the network 120. The communication module 240 may include a GSM module, a WiFi module, a Bluetooth™ module and so forth.

Figure 3:
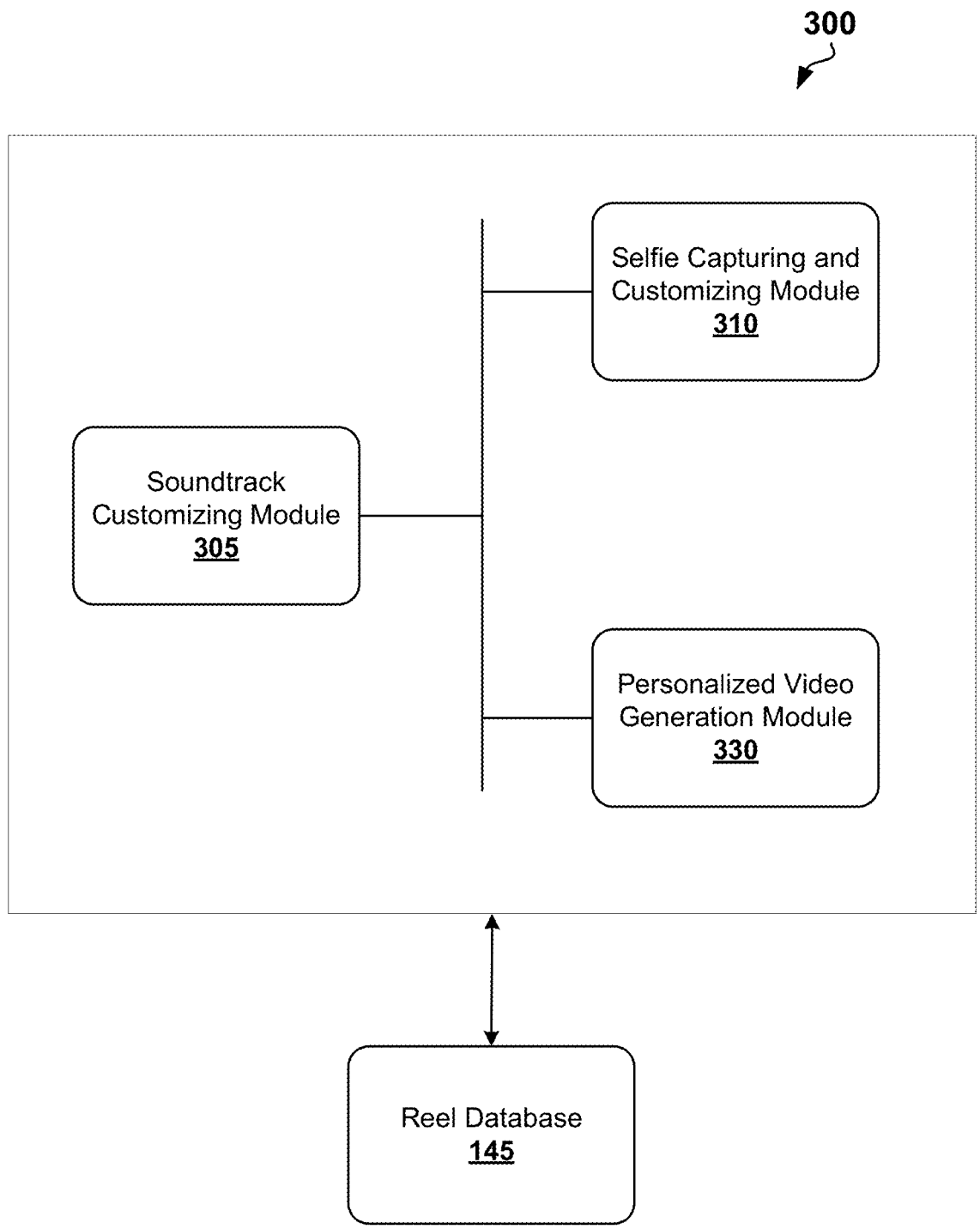
FIG. 3 is a block diagram showing a system for customizing soundtracks and hairstyles in modifiable videos of MMAs, according to some example embodiment of the disclosure.

FIG. 3 is a block diagram of system 300 for customizing soundtracks and hairstyles in modifiable videos in MMAs, according to some example embodiments of the disclosure. The system 300 may include a soundtrack customizing module 305, a selfie capturing and customizing module 310, and a personalized video generation module 330. The system 300 can be integrated in MMA 160.

The system 300 may receive a reel form the reel database 145. The reel can be selected by a user of the MMA from a list of reels. The list of reels may be generated by searching, in the reel database 145, and based on the reels matching a category or search input entered by the user. The category can be based on the time that the reel was added to the reel database 145 and a popularity metric of the reel. The popularity metric can be based on number of times when a personalized video generated based on the reel was shared by users via MMA 160.

The reels can be pre-generated recorded videos featuring an actor or multiple actors. The reels may include two-dimensional (2D) videos or 3D scenes. The reels can be pre-processed to segment the actor's face (also referred to as a target face) and background in each frame and to identify a set of parameters that can be used for further insertion of a source face instead of the face of the actor (the target face). The set of parameters can include a face texture, facial expression parameters, face color, facial identity parameters, position and angle of the face, and so forth. The set of parameters may also include a list of manipulations and operations that can be carried out on the actor's face such as the replacement of the actor's face performed in a photorealistic manner. Each of the reels may include a default soundtrack and a default text message.

In some embodiments, prior to sending the reel via the communication chat, the user can add or change a soundtrack associated with the selected reel. The soundtrack customizing module 305 can analyze recent messages of the user in the communication chat to determine context of the recent messages. The soundtrack customizing module 305 may then provide a list of soundtracks to the user. The list of soundtracks can be selected based on the context of the recent messages. The user can select a soundtrack from the list and add this soundtrack to the selected reel. Alternatively, if no information concerning the user is available, the user can be allowed to select some popular soundtracks.

In some embodiments, the user may record his voice using an audio recording system associated with the PCD 105. The soundtrack customizing module 305 can then add this voice to the soundtrack of the selected reel or modify the soundtrack of the selected reel based on the user voice.

Each time when a user selects a soundtrack for the reel, the MMA 160 may send information to MSS 130 concerning the selected reel, context of the recent messages, the list of soundtracks prompted to the user, and the soundtrack that the user has selected or an indication that no soundtrack was selected. The MSS 130 may record the information into the statistical log 150. The information can be used to adjust an algorithm for determining a list of soundtracks based on attributes of reels (a category and a default text message) and context of the recent messages.

The selfie capturing and customizing module 320 can receive an image of a user and generate a selfie (a facial image) of the user. The module 320 can analyze the hairstyle and texture of the hair in the selfie. Based on the analysis, the module 320 can suggest hairstyle modifications and texture to be applied to the selfie. The module 320 may prompt the user to select one or more selfies with the applied modifications to the hairstyle. The selfie selected by the user can be used for replacing a target face in the reels stored in the reel database 145. The details of the selfie capturing and customizing module 320 are described in FIG. 5.

The personalized video generation module 330 can generate, a personalized video from the reel based on an image of the source face The module 330 may replace the face of the actor in a reel with the selfie of the user while keeping the facial expression of the face of the actor. The module 330 may replace a face texture, face color, and facial identity of the actor with a face texture, face color, and facial identity of the selfie.

Figure 4:
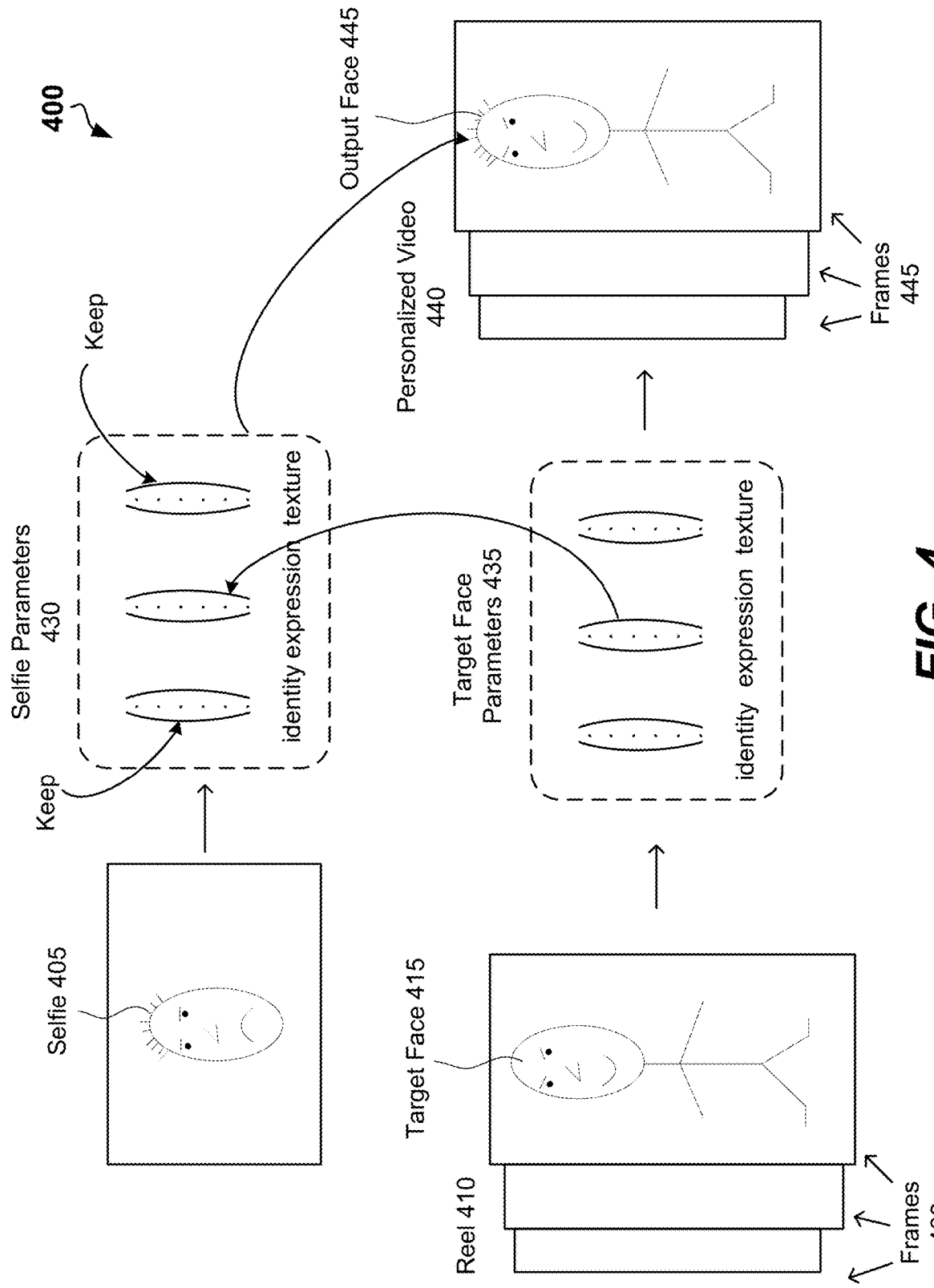
FIG. 4 is a schematic showing a process of generating a personalized video, according to an example embodiment.

FIG. 4 is a schematic showing functionality 400 of the personalized video generation module 330, according to some example embodiments. The personalized video generation module 330 may receive a selfie 405 and a reel 410. The reel 410 may include one or more frames 420. The frames 420 may include a target face 415. The facial expression of the selfie 405 can be different from the facial expression of the target face 415.

In some embodiments of the disclosure, the personalized video generation module 330 can be configured to analyze the image of the selfie 405 to extract selfie parameters 430. The selfie parameters 430 can be extracted by fitting a parametric face model to selfie 405. The parametric face model may include a template mesh. Coordinates of vertices in the template mesh may depend on two parameters: a facial identity and a facial expression. Thus, the selfie parameters 430 may include a facial identity and facial expression corresponding to the selfie 405. The selfie parameters 405 may further include a texture of the selfie 405. The texture may include colors at vertices in the template mesh. In some embodiments, a texture model associated with the template mesh can be used to determine the texture of the selfie 405.

In some embodiments of the disclosure, the personalized video generation module 330 can be configured to analyze the frames 420 of the target video 410 to extract target face parameters 435 for each of the frames 420. The target face parameters 435 can be extracted by fitting the parametric face model to the target face 415. The target parameters 435 may include facial identity and facial expression corresponding to the target face 415. The target face parameters 430 may further include texture of the target face 415. The texture of the target face 415 can be obtained using the texture model.

In some embodiments of the present disclosure, each of the frames 420 may include metadata. The metadata may include the target face parameters determined for the frame. For example, the target face parameters can be determined by the MSS 130 (shown in FIG. 1). The target face parameters can be stored in metadata of the frames of the reel 410. The reel 410 can be further downloaded to the PCD 105 and stored in reel database 145. Alternatively, the personalized video generation module 330 can pre-process the reel 410 to determine the target face parameters 435 and location parameters of the target face 415 in the frames 420. The personalized video generation module 330 may further store the target face parameters 435 and location parameters of the target face in the metadata of the corresponding frames 420. This way, the target face parameters 435 are not recomputed each time the reel 410 is selected for personalization with different source faces.

In some embodiments of the disclosure, the personalized video generation module 330 can replace the facial expression in the selfie parameters 430 with the facial expression from the target parameters 435. The personalized video generation module 330 can be further configured to synthesize an output face 445 using the parametric face model, texture module, and target parameters 435 with the replaced facial expression. The output face can be used to replace the target face 415 in frames 420 of the reel 410 to obtain frames 445 of an output video shown as personalized video 440. The output face 445 is the selfie 405 adopting the facial expression of the target face 415. The output video is the personalized video 440 generated based on the reel 410 and the selfie 405.

Figure 5:
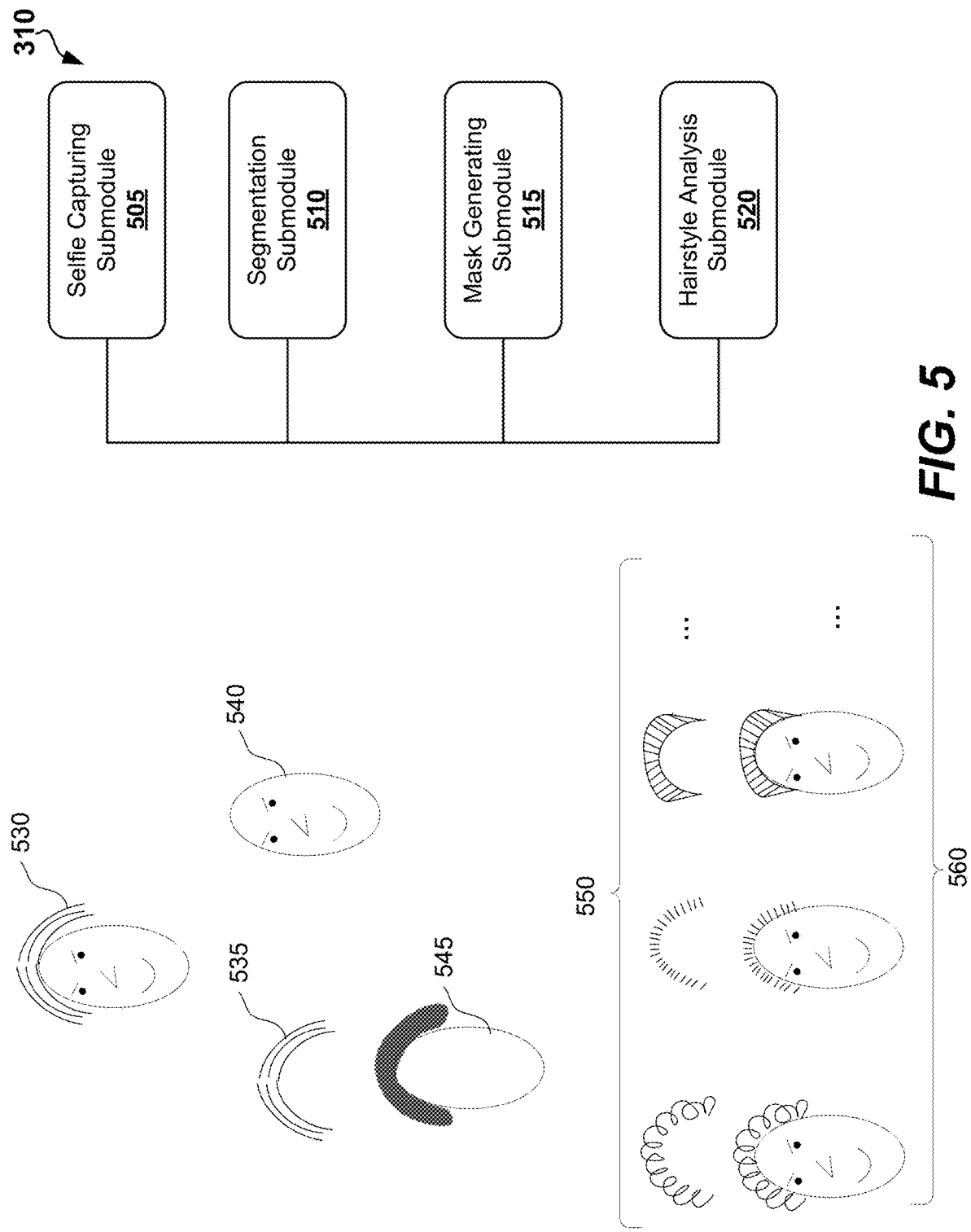
FIG. 5 is a block diagram of a selfie capturing and customization module, according to some example embodiments of the disclosure.

FIG. 5 is a block diagram of the selfie capturing and customizing module 310, according to some example embodiment of the disclosure. The selfie capturing and customizing module 310 may include a selfie capturing submodule 505, a segmentation submodule 510, a mask generating submodule 515, a hairstyle analysis submodule 520, and a selfie selection submodule 505.

The selfie capturing submodule 505 may receive an image of the user and generate, based on the image of the user, a selfie 530. The image of the user can be captured by the camera 205 of the PCD 105. The image of the user can include an image stored in the memory storage 215 of the PCD 105. The process of capturing of the selfie is described in FIG. 7.

The segmentation submodule 510 may analyze the selfie 530 to segment image of the selfie 530 into a first part 535 including the hair and a second part 540 including the face of the user. The segmentation can be performed using one of machine learning techniques (for example, a first ANN).

The mask generation module 515 may generate, based on the first part 535 and the second part 540, a mask 545 of the face in the selfie. The first part 535, the second part 540, and the mask 545 can be provided to the hairstyle analysis submodule 520.

The hairstyle analysis submodule 520 may analyze the first part 535 (image of hair in the selfie 530) and determine the hair in the selfie is modifiable. In one example embodiment, modification of the hairstyle can be activated based on a criterion. For example, the criterion can be based on a volume of hair in the selfie of the user. The submodule 520 may activate hairstyle modification if the volume of the hair exceeds a predetermined first threshold. The submodule 520 may activate hairstyle modification if the volume of the hair exceeds a predetermined second threshold. The criterion can be also based on a length of hair in the selfie of the user. The submodule 520 may activate hairstyle modification if the length of the hair is too short or too long.

The hairstyle analysis submodule 520 can analyze the hairstyle and texture of the hair in the selfie (the first part 535) to determine, by a second ANN, hairstyle modifications and texture to be applied to the selfie. The changing the texture of hair may include curling hair or straightening hair. The changing hairstyle may include shortening the hair if the hair is too long, lengthening the hair if the hair is too short, or increasing volume of the hair. The changing of hairstyle can include painting the hair in the selfie to a color different than a color of hair in selfie 530.

The submodule 520 may generate a modified selfie based on the determined modifications of hairstyle and texture. The submodule 520 may allow a user of the MMA to review the modified selfie and accept the modifications. The modified selfie can be then inserted into the reels.

In other embodiments, the submodule 520 may prompt a user to select the modified selfie from a list of modified selfies 560. Each of the modified selfies 560 can be generated by applying one of the masks 550 to the selfie 530. The masks 550 may correspond to different hairstyles suggested by hairstyle modifications to the first part 535. The masks 550 can be pre-generated using an image of a reference head. The image of the reference head can be generated by averaging images of selfies of a user.

In some embodiments, the MMA 160 may allow the user to generate different selfies with different hairstyles and store the different selfies in a user profile 135. When the user selects a reel, the personalized video generation module 330 may analyze the reel and prompt the user to use a selfie from the list of the generated selfies with most suitable hairstyles for the selected reel. In some embodiments, the user may instruct the MMA to automatically select a selfie with the most suitable hairstyle for the reel. The selection of the most suitable selfie can be made based on context of recent messages of the user in a communication chat, a category of the reel, or a text message associated with the reel.

In some embodiments, if the hair is long enough, the hair in the selfie can be animated in the reels according to movements of the head and face. To generate the hair movements in the reels, the hair in the selfie can be analyzed to produce a 3D hair model. The 3D hair model can be used by the personalized video generation module 330 to render images of the hair in the frames of reels in a such way that the hair follows movements of the head and the face of the user in the reel.

Figure 6:
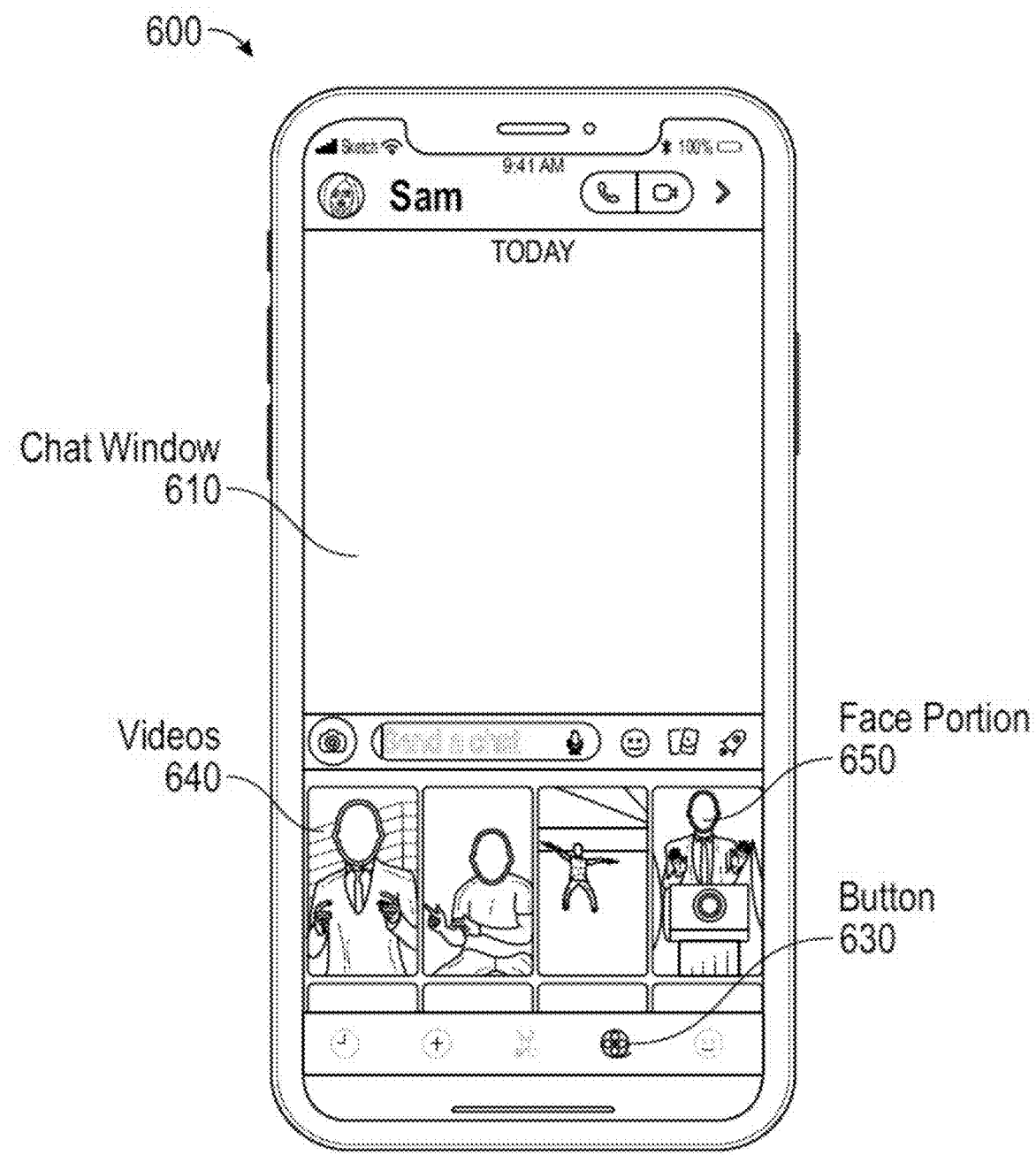

FIG. 6 shows an example screen of a user interface 600 of MMA 160, according to some example embodiments. The user interface 600 may include a chat window 610 and a section containing videos 640. The videos 640 may include reels with face portions 650 instead of faces. The pre-rendered videos may include teaser videos intended to show the user a sample representation of how the personalized video may look. The face portions 650 may be shown in the form of white ovals. In some embodiments, the videos 640 may include several face portions 650 to enable creation of multiple-person videos (i.e., videos having faces of multiple persons). A user may tap on any of the videos 640 to select one of the videos 640 for modifying and sending to the chat window 610. The modification may include receiving a selfie picture from the user (i.e., an image of a user face taken via a front camera of the PCD), obtaining a source face from the selfie picture, and modifying the selected video 640 by using the source face to create a personalized video, also referred herein to as a "Reel." Thus, as used herein, the Reel is a personalized video produced by modifying a video template (a video without a user face) into a video with the user face inserted. Therefore, the personalized video may be generated in the form of an audiovisual media (e.g., a video, an animation, or any other type of media) that features a face of a user. The modified video can be sent to the chat window 610. The user interface 600 may further have a button 630 which, upon tapping, may transition the user from the messaging application to the system for providing personalized videos according to the present disclosure and use the functionality of the system.

Figure 7:
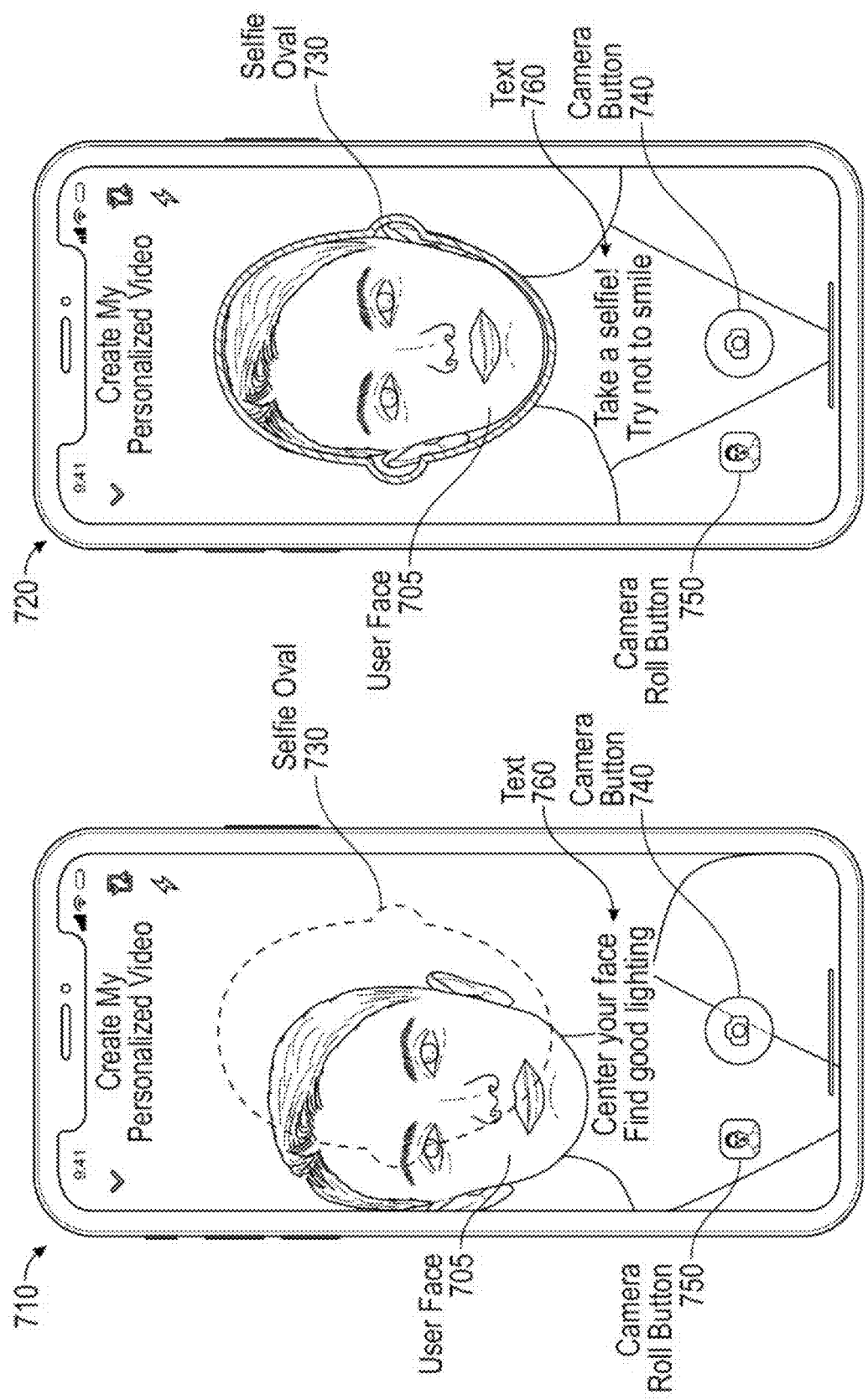

FIG. 7 shows an example screen of user interfaces 710 and 720 of MMA, according to some example embodiments. The user interfaces 710 and 720 show a selfie capturing mode in which a user may take an image of the user face, which is then used as a source face. The user interface 710 shows a live view of a camera of a PCD when the user intends to capture the selfie image. The live view may show the user face 705. The user interface 710 may show a selfie oval 730 and a camera button 740. In an example embodiment, the camera button 740 may slide up from a bottom of the screen in the selfie capturing mode. The user may need to change the position of the camera in order to position the user face 705 within the boundaries of the selfie oval 730. When the user face 705 is not centered in the selfie oval 730, the selfie oval 730 can be styled in the form of a dotted line and the camera button 740 is semi-transparent and not actionable to indicate that the camera button 740 is inactive. To notify the user that the user face is not centered, a text 760 may be displayed below the selfie oval 730. The text 760 may include instructions for the user, e.g., "Center your face," "Find good lighting," and so forth.

The user interface 720 shows a live view of the camera of the PCD 105 after the user changes the position of the camera to capture the selfie image and the user face 705 becomes centered in the selfie oval 730. In particular, when the user face 705 becomes centered in the selfie oval 730, the selfie oval 730 changes to become a bold continuous line and the camera button 740 becomes opaque and actionable to indicate that the camera button 740 is now active. To notify the user, the text 760 may be displayed below the selfie oval 730. The text 760 may instruct the user to make the selfie picture, e.g., "Take a selfie," "Try not to smile," and so forth. In some embodiments, the user may select an existing selfie picture from a picture gallery by pressing a camera roll button 750.

FIG. 8 shows an example screen of user interfaces 810 and 820 of MMA 160, according to some example embodiments. The user interfaces 810 and 820 are shown on the screen after the user takes a selfie picture. The user interface 810 may show a background 800, a schematic representation 805 of a Reel that is currently being created, and a text 815. The text 815 may include, e.g., "Creating My Reel." The user interface 820 may show a Reel 825 that was created and text portions 830 and 835. The Reel 825 may be shown in a full screen mode. The text 830 may include, e.g., "Your Reel is ready." A dark color gradient may be provided above behind the Reel 825 so the text 830 is visible. The text portion 835 may display, for example, "Use this selfie to send Reels in Chat or retake it to try again" to notify the user that the user may either use the selfie picture already taken by the user or take another selfie picture. Additionally, two buttons may be shown on the user interface 820. A button 840 may be shown with a blue and filled background and may instruct the user to "Use this Selfie." When the user taps the button 840, a two-person Reels screen may be enabled. A button 845 may be shown with a white, outlined, and transparent background and may instruct the user to "Retake Selfie." When the user taps the button 845, the user interface 710 shown on FIG. 7 may be activated and the step of creation of a Reel may be initiated as described with reference to FIG. 7. The user interface 820 may further show a subtext 850 below the buttons 840 and 845. The subtext 850 may inform how the user may delete Reel, e.g., "You can delete your Reels selfie in Settings."

Figure 9:
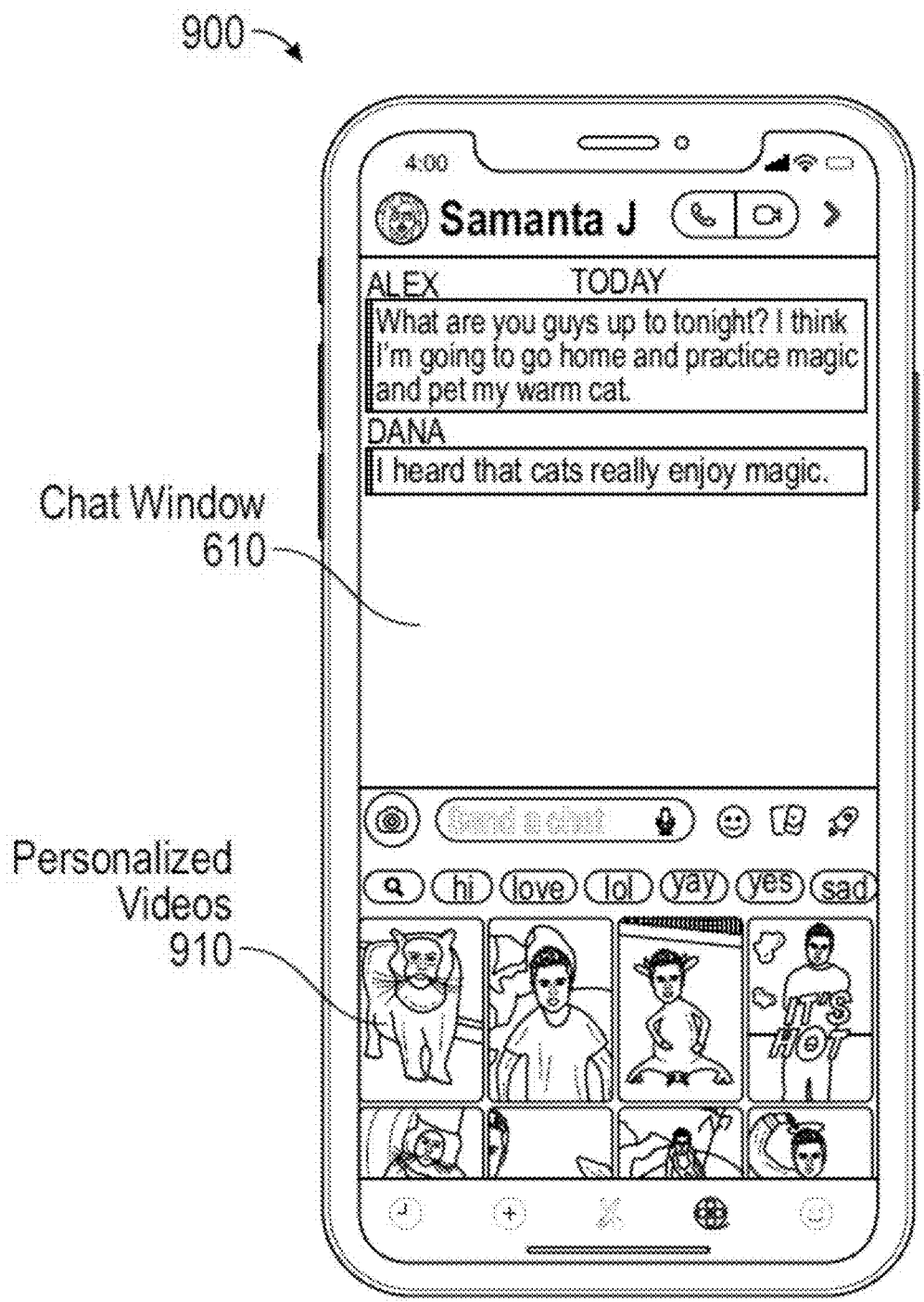

FIG. 9 shows an example screen of a user interface 900 of MMA 160, according to some example embodiments. The user interface 900 may be shown after the user selects and confirms the selfie picture of the user. The user interface 900 may show a chat window 610 and a Reels section with personalized videos 910. In an example embodiment, personalized videos 910 may be shown in a vertically scrolling list of tiles, with four personalized videos 910 tiles in each row. All personalized videos 910 may auto play (automatically play back) and loop (play back continuously). Sound may be off in all personalized videos 910 regardless of sound settings of a PCD or tapping a volume button by the user.

Figure 10:
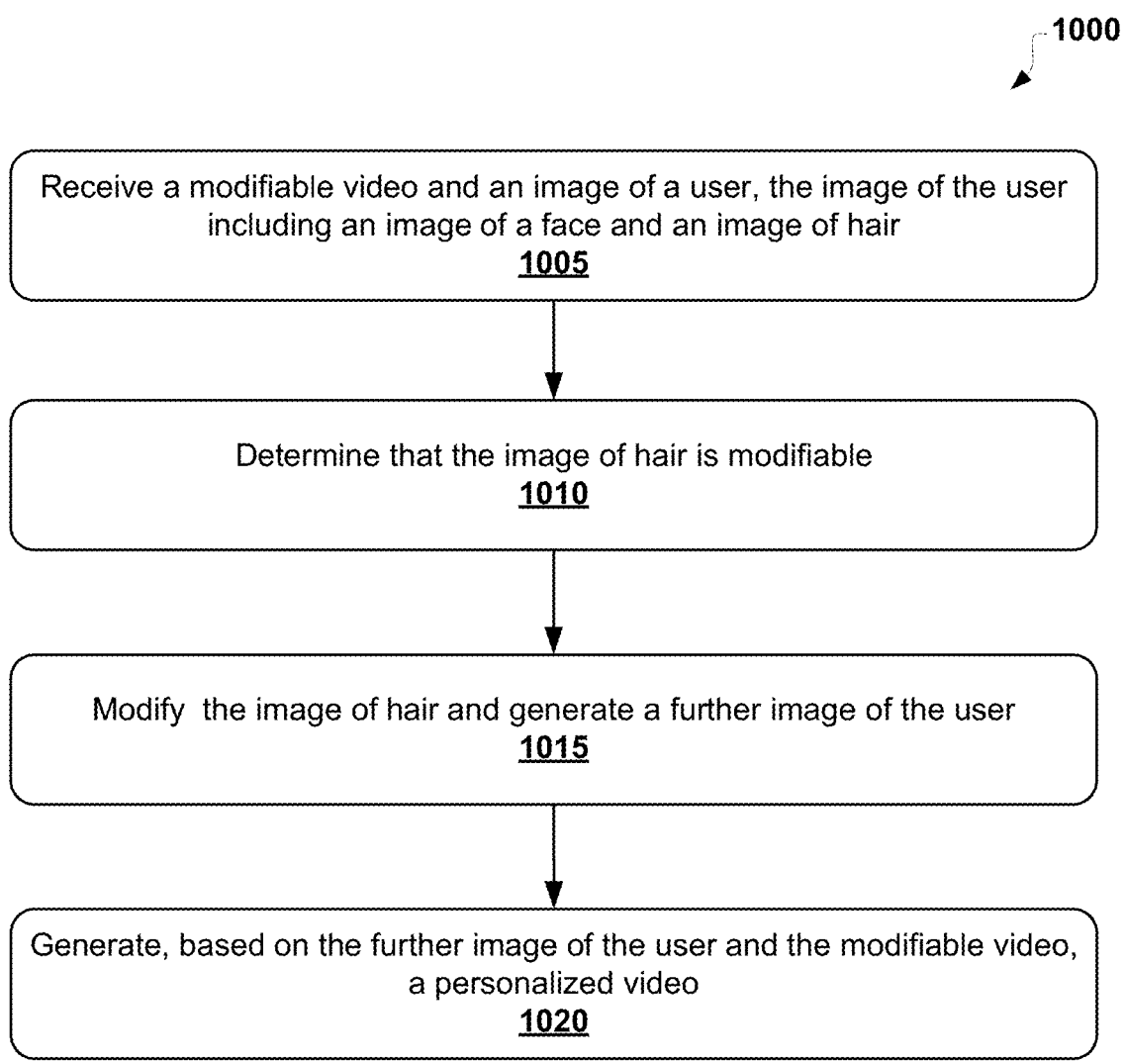
FIG. 10 is a flow chart showing a method for customizing hairstyles in modifiable videos of MMAs, according to some example embodiments.

FIG. 10 is a flow chart showing a method 1000 for customizing hairstyles in modifiable videos in MMAs, according to some example embodiments. The method 1000 can be performed by PCD 105.

The method 1000 may commence in block 1005 with receiving, via an MMA, a modifiable video and an image of a user. The image of the user may include an image of a face and an image of hair. The modulable video can be associated with a category and a text message. The category can be based on a time a modifiable video was shared via the MMA, and a number of times users shared the modifiable video via the MMA.

In block 1010, the method 1000 may include analyzing the image of the hair to determine that the image of hair is modifiable. The determination that the image of hair is modifiable may include estimating a volume of the hair and determining that the volume of the hair exceeds a first threshold. The determination that the image of hair is modifiable may include estimating a length of the hair and determining that the length of the hair exceeds a second threshold.

In block 1015, the method 1000 may include, in response to the determination that the image of hair is modifiable, modifying the image of hair and generating a further image of the user. The further image of the user may include the modified image of hair and the image of the face. Modification of the image of hair can include separating the image of hair from the image of the user. The modification of the image of hair can be performed by either applying an ANN or a mask to the separated image of the hair. The image of the hair can be modified to change a texture of the hair, a length of the hair, a color of the hair, and a volume of the hair. The modifying the image of hair can be based on the category and the text message associated with the modifiable video.

In block 1015, the method 1000 may include generating, based on the further image of the user and the modifiable video, a personalized video. The personalized video may include a part of the further image of the user and a part of the modifiable video. The image of the face in the further image can be modified to adopt a series of facial expressions. The series of facial expression can be defined by a set of facial parameters in metadata of the modifiable video.

The method 1000 may further include generating a list of further images of the user, in block 1020. Each of the further images include a further image of hair and the image of the face. The further image of hair can be the image of hair modified according to a hairstyle from a list of hairstyles. The user can be prompted, via the MMA, to select the further image from the list of the further images. The method 1000 may further include storing, by the MMA, the list of further images of the user. The method 1000 may include receiving a further modifiable video. The method 1000 may include selecting the further image from the list of further images of the users. The selection can be based on a category or a text message associated with the further modifiable video.

Figure 11:
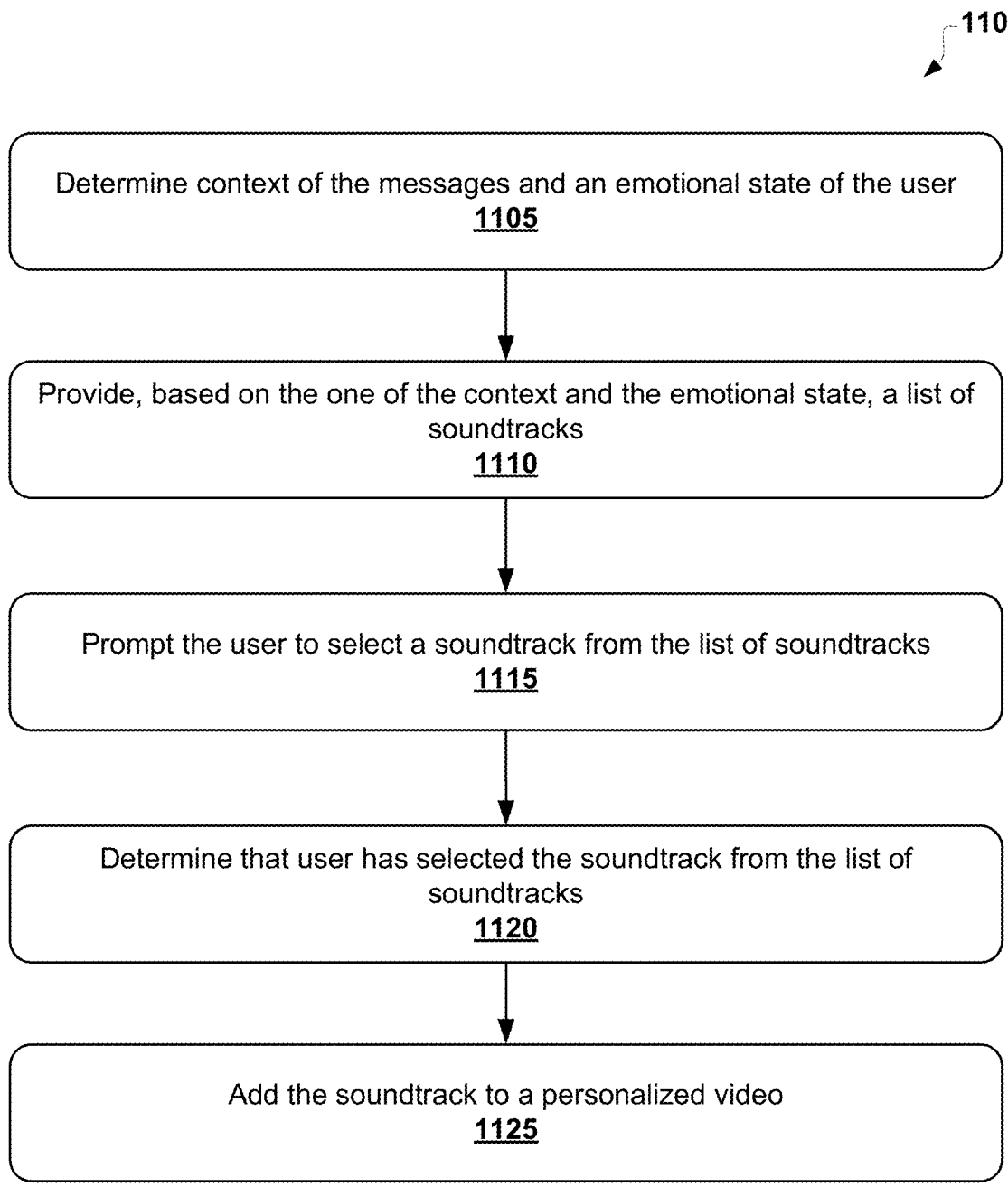
FIG. 11 is a flow chart showing a method for customizing soundtracks in modifiable videos of MMAs, according to some example embodiments.

FIG. 11 is a flow chart showing a method 1100 for customizing soundtracks in modifiable videos in MMAs, according to some example embodiments. The method 1100 can be performed by PCD 105. The method 1100 may commence in block 1105 with determining, via the MMA and based on messages of the user in a communication chat, context of the messages. The context of the messages can be determined via an ANN.

In block 1110, the method 1100 may include providing, via the MMA and based on the context, a list of soundtracks. The list of soundtracks can be selected from a soundtrack library of the user. The selection of soundtracks can be based on historical data indicating preferences of the user.

In block 1115, the method 1100 may include prompting, via the MMA, the user to select a soundtrack from the list of soundtracks.

In block 1120, the method 1100 may include determining, via the MMA, that the user has selected the soundtrack from the list of soundtracks. The list of soundtracks, the selected soundtrack, and the context can be stored in a statistical log. The statistical log can be further used to determine the historical data of preferences of the user and to train an algorithm for selection of soundtracks from the library of the user.

In block 1125, the method 1100 may include adding the soundtrack to a personalized video. The process of generation of the personalized video is described in FIG. 11. Prior to adding the soundtrack, the soundtrack can be modified based on a voice sample of the user.

Figure 12:
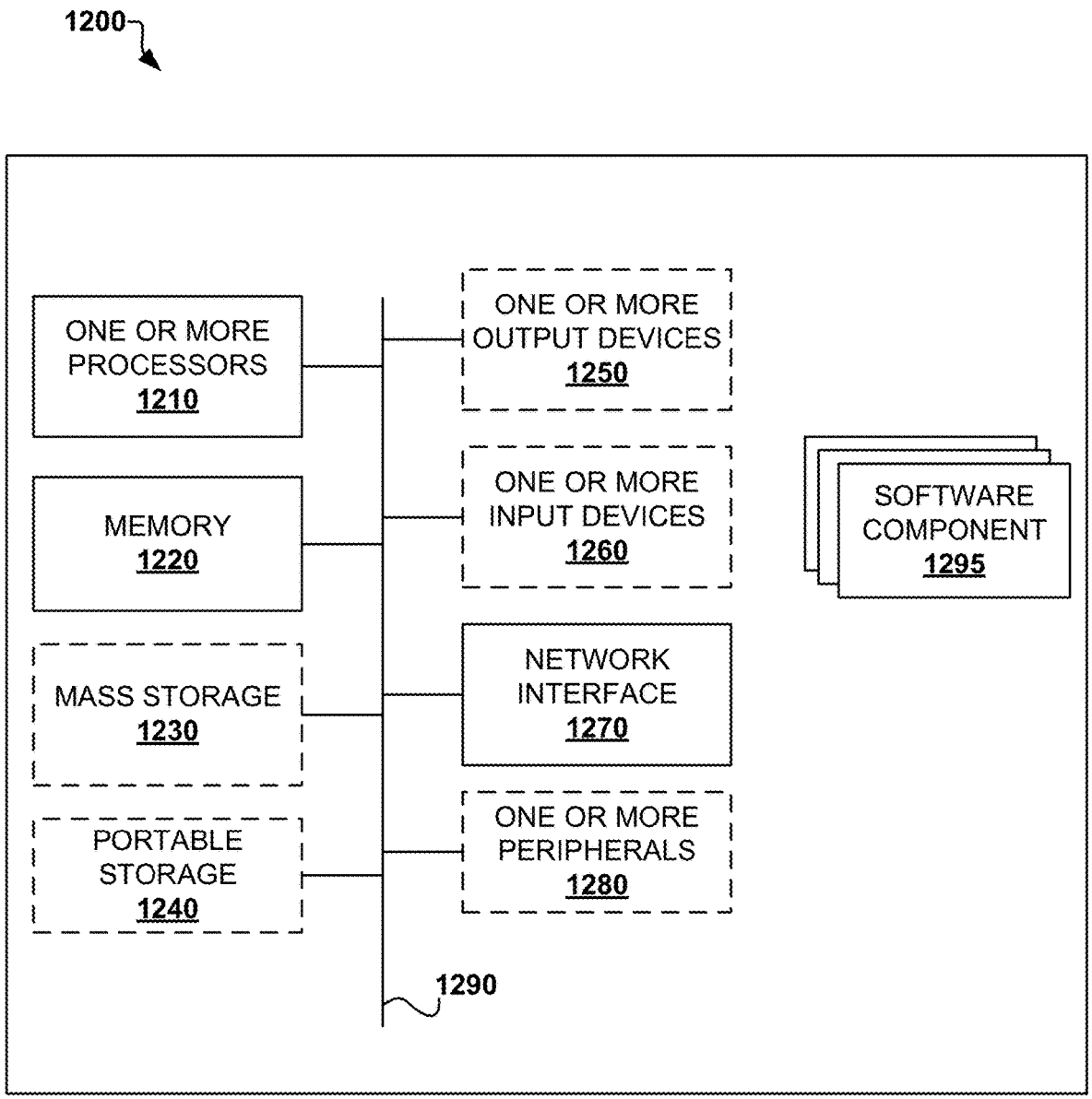
FIG. 12 shows an example computer system that can be used to implement methods for customizing soundtracks and hairstyles of modifiable videos of MMAs.

FIG. 12 illustrates an example computing system 1200 that can be used to implement methods described herein. The computing system 1100 can be implemented in the contexts of the likes of PCDs 105 and 110, the MSS 130, the MMA 160, and the system 300 for customizing soundtracks and hairstyles in modifiable videos in MMAs.

As shown in FIG. 12, the hardware components of the computing system 1200 may include one or more processors 1210 and memory 1220. Memory 1220 stores, in part, instructions and data for execution by processor 1210. Memory 1220 can store the executable code when the system 1200 is in operation. The system 1200 may further include an optional mass storage device 1230, optional portable storage medium drive(s) 1240, one or more optional output devices 1250, one or more optional input devices 1260, an optional network interface 1270, and one or more optional peripheral devices 1280. The computing system 1200 can also include one or more software components 1295 (e.g., ones that can implement the method for providing personalized videos as described herein).

The components shown in FIG. 12 are depicted as being connected via a single bus 1290. The components may be connected through one or more data transport means or data network. The processor 1210 and memory 1220 may be connected via a local microprocessor bus, and the mass storage device 1230, peripheral device(s) 1280, portable storage device 1240, and network interface 1270 may be connected via one or more input/output (I/O) buses.

The mass storage device 1230, which may be implemented with a magnetic disk drive, solid-state disk drive, or an optical disk drive, is a non-volatile storage device for storing data and instructions for use by the processor 1210. Mass storage device 1230 can store the system software (e.g., software components 1295) for implementing embodiments described herein.

Portable storage medium drive(s) 1240 operates in conjunction with a portable non-volatile storage medium, such as a compact disk (CD), or digital video disc (DVD), to input and output data and code to and from the computing system 1200. The system software (e.g., software components 1295) for implementing embodiments described herein may be stored on such a portable medium and input to the computing system 1100 via the portable storage medium drive(s) 1240.

The optional input devices 1260 provide a portion of a user interface. The input devices 1260 may include an alphanumeric keypad, such as a keyboard, for inputting alphanumeric and other information, or a pointing device, such as a mouse, a trackball, a stylus, or cursor direction keys. The input devices 1260 can also include a camera or scanner. Additionally, the system 1200 as shown in FIG. 12 includes optional output devices 1250. Suitable output devices include speakers, printers, network interfaces, and monitors.

The network interface 1270 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 1270 may be a network interface card, such as an Ethernet card, optical transceiver, radio frequency transceiver, or any other type of device that can send and receive information. The optional peripherals 1280 may include any type of computer support device to add additional functionality to the computer system.

The components contained in the computing system 1200 are intended to represent a broad category of computer components. Thus, the computing system 1200 can be a server, personal computer, hand-held computing device, telephone, mobile computing device, workstation, minicomputer, mainframe computer, network node, or any other computing device. The computing system 1100 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM).

Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for customizing soundtracks and hairstyles in modifiable videos in MMAs have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for customizing soundtracks and hairstyles in modifiable videos, the system comprising at least one processor and a memory storing processor-executable codes, wherein the at least one processor is configured to implement the following operations upon executing the processor-executable codes:
   receiving, by a computing device, a modifiable video and an image of a user, the image of the user including an image of a face and an image of hair;
   analyzing, by the computing device, the image of hair to determine that a criterion for activating a modification of the image of hair is satisfied, wherein the analyzing includes separating the image of hair from the image of the user and the criterion includes a volume or a length of hair in the separated image of hair;
   in response to the determination, modifying, by the computing device, the image of hair and generating a further image of the user, wherein the further image of the user includes the modified image of hair and the image of the face;
   generating, by the computing device and based on the further image of the user and the modifiable video, a personalized video, wherein the personalized video includes a part of the further image of the user and a part of the modifiable video.

2. The system of claim 1, further comprising:
   determining, based on messages of the user in a communication chat, context of the messages;
   providing, based on the context, a list of soundtracks;
   prompting the user to select a soundtrack from the list of soundtracks;
   determining that the user has selected the soundtrack from the list of soundtracks; and
   based on the determination, selectively adding the soundtrack to the personalized video.

3. The system of claim 2, further comprising, prior to adding the soundtrack, modifying the soundtrack with a voice sample of the user.

4. The system of claim 1, wherein the determining that the criterion for activating the modification of the image of hair is satisfied includes:
   estimating a volume of the hair; and
   determining that the volume of the hair exceeds a threshold.

5. The system of claim 1, wherein the modifying the image of hair includes changing one or more of the following: a texture of the hair, a length of the hair, a color of the hair, and a volume of the hair.

6. The system of claim 1, wherein the modifying the image of hair includes:
   separating the image of hair from the image of the user; and
   applying an artificial neural network to the separated image of the hair.

7. The system of claim 1, wherein the modifying the image of hair includes:
   separating the image of hair from the image of the user; and
   applying a mask to the separated image of the hair.

8. The system of claim 1, wherein the modifying the image of hair is based on a category and a text message associated with the modifiable video.

9. The system of claim 1, further comprising, after the determination that the image of the hair is modifiable:
   generating a list of further images of the user, wherein the further images include a further image of hair and the image of the face, the further image of hair being the image of hair modified according to a hairstyle from a list of hairstyles; and
   prompting, via the MMA, the user to select the further image from the list of the further images.

10. The system of claim 1, further comprising:
    storing, by the MMA, the list of further images of the user in the memory; and
    upon receiving a further modifiable video, selecting the further image from the list of further images of the user, wherein the selection is based on one of a category or a text message associated with the further modifiable video.

11. A method for customizing soundtracks and hairstyles in modifiable videos in multimedia messaging applications (MMAs), the method comprising:

receiving, by a computing device, a modifiable video and an image of a user, the image of the user including an image of a face and an image of hair;

analyzing, by the computing device, the image of hair to determine that a criterion for activating a modification of the image of hair is satisfied, wherein the analyzing includes separating the image of hair from the image of the user and the criterion includes a volume or a length of hair in the separated image of hair;

in response to the determination, modifying, by the computing device, the image of hair and generating a further image of the user, wherein the further image of the user includes the modified image of hair and the image of the face; and generating, by the computing device and based on the further image of the user and the modifiable video, a personalized video, wherein the personalized video includes a part of the further image of the user and a part of the modifiable video.

12. The method of claim 11, further comprising:

determining based on messages of the user in a communication chat, context of the messages;

providing based on the context, a list of soundtracks;

prompting, via the MMA, the user to select a soundtrack from the list of soundtracks;

determining that user has selected the soundtrack from the list of soundtracks; and based on the determination, selectively adding the soundtrack to the personalized video.

13. The method of claim 12, further comprising, prior to adding the soundtrack, modifying the soundtrack with a voice sample of the user.

14. The method of claim 11, wherein the determining that the criterion for activating a modification of the image of hair is satisfied includes:

estimating a volume of the hair; and determining that the volume of the hair exceeds a threshold.

15. The method of claim 11, wherein the modifying the image of hair includes changing one or more of the following: a texture of the hair, a length of the hair, a color of the hair, and a volume of the hair.

16. The method of claim 11, wherein the modifying the image of hair includes:

separating the image of hair from the image of the user; and applying an artificial neural network to the separated image of the hair.

17. The method of claim 11, wherein the modifying the image of hair includes:

separating the image of hair from the image of the user; and applying a mask to the separated image of the hair.

18. The method of claim 11, wherein the modifying the image of hair is based on a category and a text message associated with the modifiable video.

19. The method of claim 11, further comprising, after the determination that the image of the hair is modifiable:

generating a list of further images of the user, wherein the further images include a further image of hair and the image of face, the further image of hair being the image of hair modified according to a hairstyle selected from a list of hairstyles; and prompting, via the MMA, the user to select the further image from the list of the further images.

20. A non-transitory processor-readable medium having instructions stored thereon, which when executed by one or more processors, cause the one or more processors to implement a method for providing personalized videos, the method comprising:

receiving, by a computing device, a modifiable video and an image of a user, the image of the user including an image of a face and an image of hair;

analyzing, by the computing device, the image of hair to determine that a criterion for activating a modification of the image of hair is satisfied, wherein the analyzing includes separating the image of hair from the image of the user and the criterion includes a volume or a length of hair in the separated image of hair;

in response to the determination, modifying, by the computing device, the image of hair and generating a further image of the user, wherein the further image of the user includes the modified image of hair and the image of the face;

generating, by the computing device and based on the further image of the user and the modifiable video, a personalized video, wherein the personalized video includes a part of the further image of the user and a part of the modifiable video.

* * * * *